United States Patent
Lee et al.

(10) Patent No.: US 7,211,352 B2
(45) Date of Patent: May 1, 2007

(54) SINGLE ION CONDUCTOR-CONTAINING COMPOSITE POLYMER ELECTROLYTE FOR LITHIUM SECONDARY BATTERY AND METHOD OF MANUFACTURING THE SAME

(75) Inventors: Young Gi Lee, Daejeon (KR); Kwang Sun Ryu, Daejeon (KR); Soon Ho Chang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 234 days.

(21) Appl. No.: 10/750,152

(22) Filed: Dec. 30, 2003

(65) Prior Publication Data

US 2004/0214089 A1    Oct. 28, 2004

(30) Foreign Application Priority Data

Apr. 25, 2003  (KR) .................. 10-2003-0026420

(51) Int. Cl.
*H01M 10/40* (2006.01)
*H01M 6/18* (2006.01)
*H01M 4/66* (2006.01)

(52) U.S. Cl. ............... 429/309; 429/314; 429/316; 429/317; 429/319; 429/320; 429/321; 429/310; 429/306; 429/322; 429/323

(58) Field of Classification Search ............ None
See application file for complete search history.

(56) References Cited

U.S. PATENT DOCUMENTS 5,219,679 A  6/1993  Abraham et al.
5,296,318 A  3/1994  Gozdz et al.
6,645,675 B1 * 11/2003  Munshi ............... 429/305

OTHER PUBLICATIONS www.smallparts.com/products/descriptions (porous pvdf and porous polyethylene).*
www.osmolabstore.com (OEM GE PVDF (polyvinylidene fluoride) Transfer Membranes) (porous pvdf).*
Performance of Bellcore's plastic rechargeable Li-ion batteries, J.M. Tarascon, A.S. Gozdz, C. Schmutz, F. Shokoohi, P.C. Warren, Solid State Ionics 86-88 (1996), pp. 49-54.
J. Electrochem. Soc., vol. 142, No. 6, Jun. 1995, pp. 1789-1798.

* cited by examiner

*Primary Examiner*—Patrick J. Ryan
*Assistant Examiner*—Angela J. Martin
(74) *Attorney, Agent, or Firm*—Blakely Sokoloff Taylor & Zafman

(57) ABSTRACT

Provided are a composite polymer electrolyte for a lithium secondary battery that includes a composite polymer matrix structure having a single ion conductor-containing polymer matrix to enhance ionic conductivity and a method of manufacturing the same. The composite polymer electrolyte includes a first polymer matrix made of a first porous polymer with a first pore size; a second polymer matrix made of a single ion conductor, an inorganic material, and a second porous polymer with a second pore size smaller than the first pore size. The second polymer matrix is coated on a surface of the first polymer matrix. The composite polymer matrix structure can increase mechanical properties. The single ion conductor-containing porous polymer matrix of a submicro-scale can enhance ionic conductivity and the charge/discharge cycle stability.

12 Claims, 4 Drawing Sheets

SINGLE ION CONDUCTOR-CONTAINING COMPOSITE POLYMER ELECTROLYTE FOR LITHIUM SECONDARY BATTERY AND METHOD OF MANUFACTURING THE SAME

BACKGROUND OF THE INVENTION

This application claims the priority of Korean Patent Application No. 2003-26420, filed on Apr. 25, 2003, in the Korean Intellectual Property Office, the disclosure of which is incorporated herein in its entirety by reference.

1. Field of the Invention

The present invention relates to a polymer electrolyte for a lithium secondary battery and a method of manufacturing the same. More particularly, the present invention relates to a composite polymer electrolyte for a lithium secondary battery, which includes a composite polymer matrix structure comprised of two porous polymer matrices of different pore sizes impregnated with an electrolyte solution, and a method of manufacturing the same.

2. Description of the Related Art

Recently, as electric, electronic, communication, and computer industries are rapidly expanding, demands for secondary batteries with high performance and high stability have increased. In particular, as electronic devices progressively become small, thin, and lightweight, in the office automation field, desktop computers are being replaced with laptop or notebook computers that are smaller and lighter than the desktop computers. Also, the use of portable electronic devices such as camcorders and cellular phones has rapidly grown.

As electronic devices become small, thin, and lightweight, secondary batteries that are used as power supply sources for the electronic devices are also required to have higher performance. For this, lithium secondary batteries to replace conventional lead storage batteries or lithium-cadmium batteries have been actively researched and developed to satisfy the requirements of small-size, lightness, high energy density, and frequent charging operations.

The lithium secondary batteries include a cathode and an anode made of an active material that can induce intercalation and de-intercalation of lithium ions. An organic electrolyte or a polymer electrolyte that allows for the movement of the lithium ions is interposed between the cathode and the anode. The lithium secondary batteries generate electric energy by oxidation/reduction due to intercalation/de-intercalation of the lithium ions in the cathode and the anode.

The cathode of the lithium secondary batteries has a potential higher than the electrode potential of lithium, by as much as about 3 to 4.5 V, and is mainly made of complex oxide of lithium with transition metal for intercalation/de-intercalation of the lithium ions. For example, lithium cobalt oxide ($LiCoO_2$), lithium nickel oxide ($LiNiO_2$), and lithium manganese oxide ($LiMnO_2$) are mainly used as a cathode material. On the other hand, the anode is mainly made of a lithium metal, a lithium alloy, or a carbonaceous material that exhibits a chemical potential similar to the lithium metal upon the intercalation/de-intercalation of the lithium ions, so as to reversibly receive or emit the lithium ions while maintaining structural and electrical properties.

The lithium secondary batteries are classified into lithium ion batteries (LIBs) and lithium polymer batteries (LPBs) according to the types of electrolytes. While the lithium ion batteries use a liquid electrolyte/separation film system, the lithium polymer batteries use a polymer electrolyte. In particular, the lithium polymer batteries can be sub-classified into lithium metal polymer batteries (LMPBs) using a lithium metal as an anode and lithium ion polymer batteries (LIPBs) using carbon as the anode. In the lithium ion batteries using a liquid electrolyte, there arise problems due to instability of the liquid electrolyte. Although alternatives such as use of an electrode material capable of compensating for the instability of the liquid electrolyte or installation of a safety apparatus can be considered, a manufacture cost increases and it is difficult to increase the capacity of the batteries. On the contrary, the lithium polymer batteries have many advantages such as low manufacture cost, diversity of size and shape, and high voltage and large capacity by lamination. Therefore, attention has been paid to the lithium polymer batteries as next generation batteries.

In order for the lithium polymer batteries to be commercially available, the polymer electrolyte must satisfy the requirements such as excellent ionic conductivity, mechanical properties, and interfacial stability between it and electrodes. In particular, in the lithium metal polymer batteries, dendritic growth of lithium on a lithium anode, formation of dead lithium, or interfacial phenomenon between the lithium anode and the polymer electrolyte adversely affects the stability and cycle characteristics of the batteries. In view of these problems, various polymer electrolytes have been developed.

At an initial stage for developments of polymer electrolytes, solventless polymer electrolytes had been mainly studied. The solventless polymer electrolytes are manufactured by dissolving a mixture of a salt with polyethylene oxide or polypropylene oxide in a co-solvent, followed by casting (see EP78505 and U.S. Pat. No. 5,102,752). However, the solventless polymer electrolytes have very low ionic conductivity at room temperature.

Gel polymer electrolytes are another example of the polymer electrolytes. The gel polymer electrolytes have high ionic conductivity of more than $10^{-3}$ S/cm, and are manufactured in the form of a film after dissolving a salt and a common polymer such as polyacrylonitrile, polymethylmethacrylate, polyvinylchloride, and polyvinylidene fluoride in an organic solvent such as ethylene carbonate and propylene carbonate and a co-solvent [K. M. Abraham et al., J. Electrochem. Soc., 142, 1789, 1995]. However, these gel polymer electrolytes have automation process-related problems such as deterioration of mechanical properties due to the used organic solvent, a need of a specific process condition when actually used for the lithium polymer batteries, and removal of the co-solvent.

Recently, there is disclosed a method of manufacturing lithium secondary batteries, which includes: preparing a porous polymer matrix, laminating a cathode, the porous polymer matrix, and an anode to produce a laminate, and impregnating the laminate with an electrolyte solution [J. M. Tarascon et al., Solid State Ionics, 86–88, 49, 1996; and U.S. Pat. No. 5,456,000]. In this case, although ionic conductivity is slightly enhanced, mechanical properties are little enhanced.

In spite of numerous attempts to improve the physicochemical properties of polymer electrolytes as described above, current polymer electrolytes still exhibit low ionic conductivity and insufficient mechanical properties, as compared to the electrolyte solution/separation film system of the lithium ion batteries. This is because due to compatibility between a polymer matrix and an electrolyte solution, an electrolyte film becomes flexible as impregnation of the polymer matrix with the electrolyte solution increases. Also, since the electrolyte film has more compact microporous morphology relative to the separation film, an ion transfer path is curved, and thus, an ion transfer distance becomes long. For this reason, the lithium metal polymer batteries exhibit drastically low ionic conductivity, relative to the lithium ion batteries, even though dendritic growth of lithium at a surface of a lithium anode is slightly prevented. Therefore, thin film formation for the polymer electrolyte is difficult and the total resistance of batteries is increased, thereby deteriorating charge/discharge cycle performance.

SUMMARY OF THE INVENTION

The present invention provides a thin film, composite polymer electrolyte for a lithium secondary battery, which has improved ionic conductivity and mechanical properties.

The present invention also provides a simplified method of manufacturing the thin film, composite polymer electrolyte for a lithium secondary battery.

According to an aspect of the present invention, there is provided a composite polymer electrolyte for a lithium secondary battery, which comprises: a first polymer matrix made of a first porous polymer with a first pore size; a second polymer matrix coated on the first polymer matrix and made of a single ion conductor, an inorganic material, and a second porous polymer with a second pore size smaller than the first pore size; and an electrolyte solution impregnated into the first polymer matrix and the second polymer matrix. The first polymer matrix may have a thickness of 10 to 25 μm and the second polymer matrix may have a thickness of 0.5 to 10 μm.

The single ion conductor may be perfluorinated ionomer, methylmethacrylate/alkaline metal methacrylate copolymer ionomer, methylmethacrylate/alkaline itaconate copolymer ionomer, methylmethacrylate/alkaline maleate copolymer ionomer, polystyrene ionomer, or a blend thereof.

According to another aspect of the present invention, there is provided a method of manufacturing a composite polymer electrolyte for a lithium secondary battery. A first polymer matrix made of a first porous polymer with a first pore size is prepared. A single ion conductor, an inorganic material, and a second porous polymer with a second pore size smaller than the first pore size are dissolved in a co-solvent in a predetermined ratio to produce a solution. The first polymer matrix is coated with the solution to form a second polymer matrix on the first polymer matrix. The first polymer matrix and the second polymer matrix are impregnated with an electrolyte solution.

The polymer electrolyte for a lithium secondary battery according to the present invention has excellent mechanical properties due to a composite polymer matrix structure comprised of porous polymer matrices of different pore sizes, and excellent ionic conductivity due to a single ion conductor-containing porous polymer matrix of a submicro-scale. Also, erosion of a lithium anode and dendritic growth of lithium on a surface of the lithium anode are prevented, thereby preventing a short-circuit of the battery. Furthermore, the charge/discharge cycle performance and stability of a lithium metal polymer secondary battery are remarkably enhanced. Still furthermore, the polymer electrolyte of the present invention can be manufactured in the form of an ultra-thin film and a manufacture process is also simplified.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
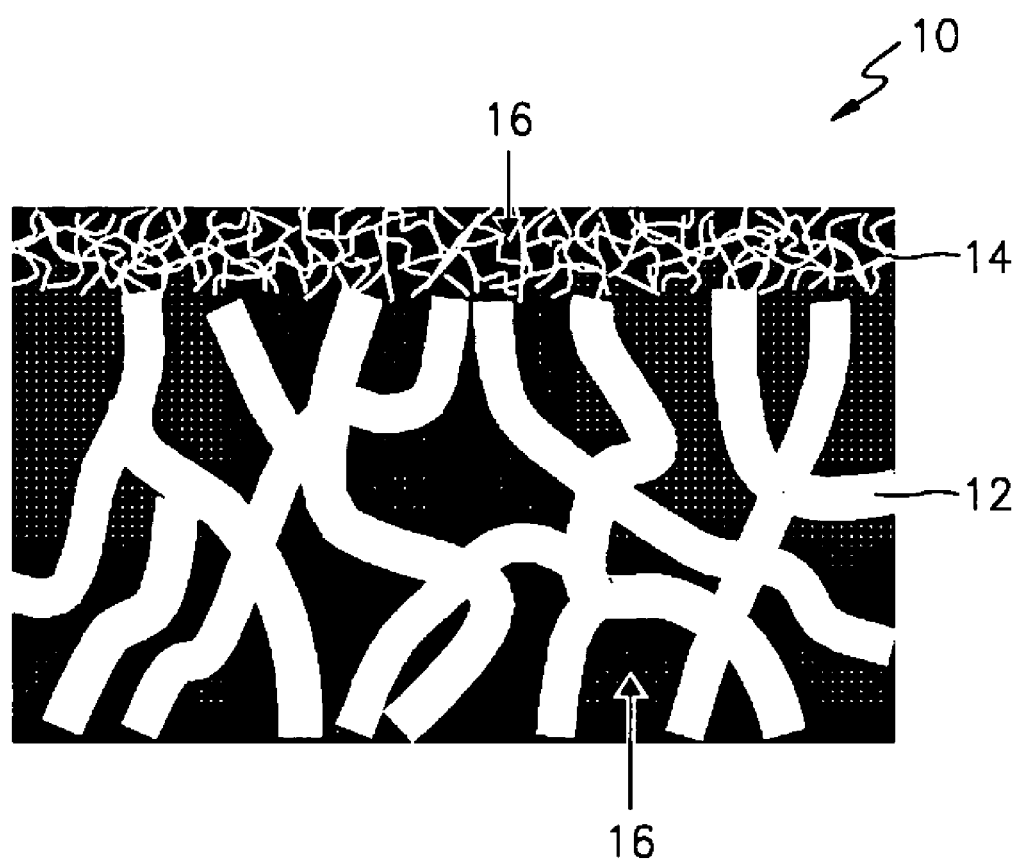
FIG. 1 depicts a schematic structure of a composite polymer electrolyte for a lithium secondary battery according to a preferred embodiment of the present invention.

FIG. 1 is a schematic sectional view that depicts a structure of a composite polymer electrolyte for a lithium secondary battery according to a preferred embodiment of the present invention.

Referring to FIG. 1, a composite polymer electrolyte 10 for a lithium secondary battery according to the present invention includes a first polymer matrix 12 made of a first porous polymer with a first pore size and a second polymer matrix 14 coated on a surface of the first polymer matrix 12. The second polymer matrix 14 is made of a single ion conductor, an inorganic material, and a second porous polymer with a second pore size (submicro-scale) smaller than the first pore size. Preferably, the first polymer matrix 12 has a thickness of 10 to 25 μm and the second polymer matrix 14 has a thickness of 0.5 to 10 μm.

The first polymer matrix 12 and the second polymer matrix 14 are impregnated with an electrolyte solution 16.

The first porous polymer for the first polymer matrix 12 may be polyethylene, polypropylene, polyimide, polysulfone, polyurethane, polyvinylchloride, cellulose, nylon, polyacrylonitrile, polyvinylidene fluoride, polytetrafluoroethylene, a copolymer or blend thereof.

The single ion conductor for the second polymer matrix 14 may be perfluorinated ionomer, methylmethacrylate/alkaline metal methacrylate copolymer ionomer, methylmethacrylate/alkaline itaconate copolymer ionomer, methylmethacrylate/alkaline maleate copolymer ionomer, polystyrene ionomer, or a blend thereof.

The second porous polymer for the second polymer matrix 14 may be a vinylidene fluoride based polymer, an acrylate based polymer, a copolymer or blend thereof. Preferably, the second porous polymer is a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybutylmethacrylate, polyvinylacetate, polyethylene oxide, polypropylene oxide, a copolymer or blend thereof.

The inorganic material for the second polymer matrix 14 may be silica, talc, alumina ($Al_2O_3$), γ-$LiAlO_2$, $TiO_2$, zeolite, molybdenum phosphate hydrate, or tungsten phosphate hydrate. The inorganic material may be added in an amount of 1 to 100% by weight, preferably about 1 to 50% by weight, based on the total weight of the polymer of the second polymer matrix 14.

The electrolyte solution 16 is impregnated into the first polymer matrix 12 and the second polymer matrix 14 in an amount of 1 to 1,000% by weight, preferably about 1 to 500% by weight, based on the total weight of the polymer of the first polymer matrix 12 and the second polymer matrix 14.

The electrolyte solution 16 may be made of ethylene carbonate, propylene carbonate, dimethyl carbonate, diethyl carbonate, methylethyl carbonate, tetrahydrofuran, 2-methyltetrahydrofuran, dimethoxyethane, methyl formate, ethyl formate, gamma-butyrolactone, or a mixture thereof.

A lithium salt is dissolved in the electrolyte solution 16 in an amount of about 1 to 200% by weight, preferably about 1 to 100% by weight, based on the total weight of the polymer of the first polymer matrix 12 and the second polymer matrix 14.

The lithium salt may be at least one selected from the group consisting of lithium perchlorate ($LiClO_4$), lithium triflate ($LiCF_3SO_3$), lithium hexafluorophosphate ($LiPF_6$), lithium tetrafluoroborate ($LiBF_4$), and lithium trifluoromethanesulfonylimide ($LiN(CF_3SO_2)_2$).

Figure 2:
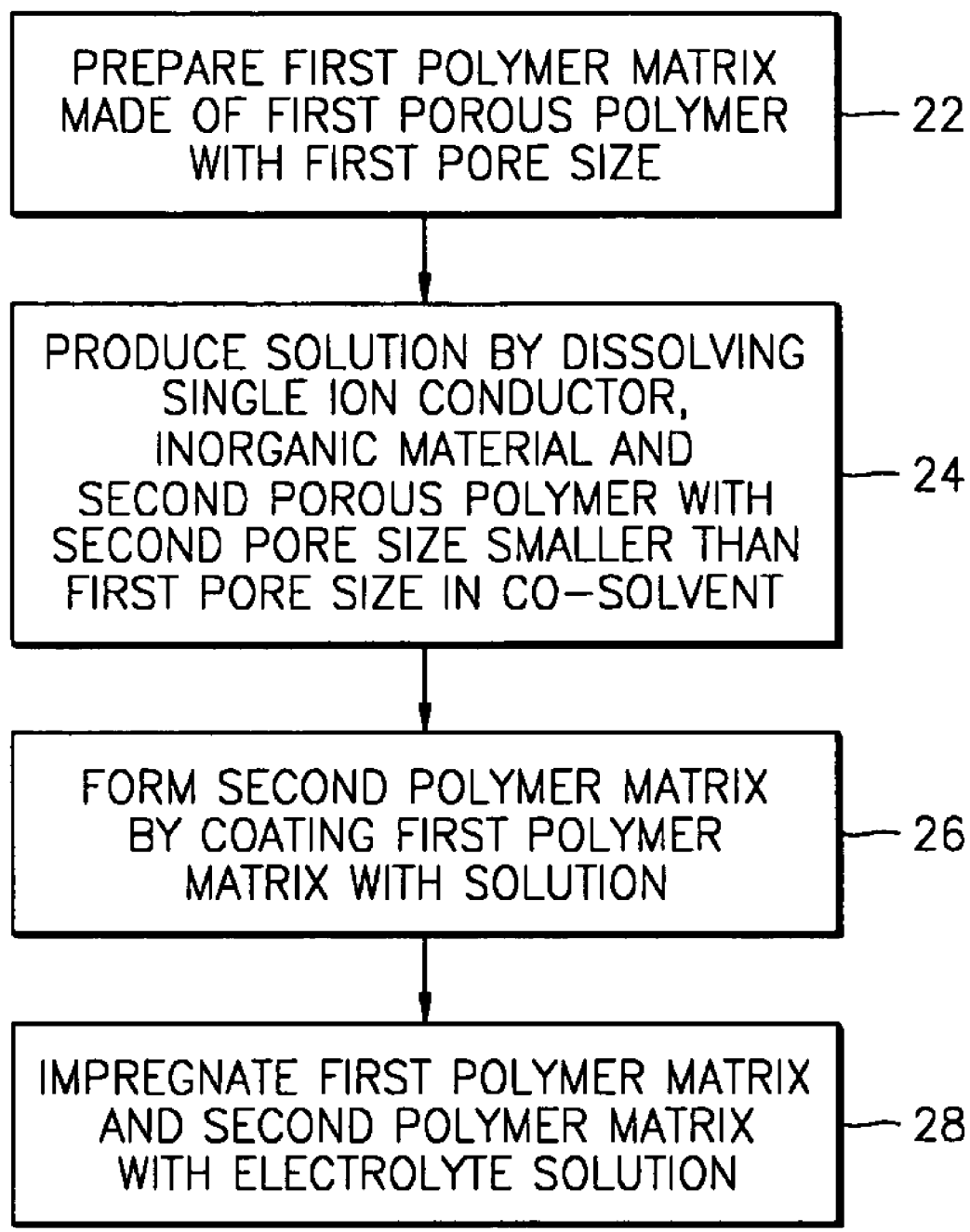
FIG. 2 is a flowchart that illustrates a process of manufacturing a composite polymer electrolyte for a lithium secondary battery according to a preferred embodiment of the present invention.

FIG. 2 is a flowchart that illustrates a process of manufacturing a composite polymer electrolyte for a lithium secondary battery according to a preferred embodiment of the present invention.

Referring to FIGS. 1 and 2, first, the first polymer matrix 12 made of the first porous polymer with micro-scale morphology is formed to a thickness of about 10 to 25 μm (step 22).

Next, the single ion conductor, the inorganic material, and the second porous polymer with submicro-scale morphology are uniformly dissolved in a predetermined ratio in a co-solvent to produce a solution (step 24). Here, the co-solvent may be selected from the group consisting of ethanol, methanol, isopropyl alcohol, acetone, dimethylformamide, dimethylsulfoxide, N-methylpyrrolidone, and a mixture thereof.

The solution is coated on a surface of the first polymer matrix 12 to form the second polymer film 14 with a thickness of about 0.5 to 10 μm (step 26). As a result, the composite polymer matrix structure comprised of the first polymer matrix 12 and the second polymer matrix 14 that are different in morphologies by different pore sizes is produced.

Next, the first polymer matrix 12 and the second polymer matrix 14 are impregnated with the electrolyte solution 16 to complete the composite polymer electrolyte 10 as shown in FIG. 1 (step 28).

Hereinafter, the method of manufacturing composite polymer electrolytes for lithium secondary batteries according to the present invention will be described more specifically by way of Examples. It is, however, to be borne in mind that the following Examples are provided only for illustrations and thus the present invention is by no means limited to or by them.

EXAMPLE 1

In order to manufacture a composite polymer electrolyte for a lithium secondary battery according to the process illustrated in FIGS. 1 and 2, first, a copolymer of vinylidene fluoride and hexafluoropropylene was dissolved with perfluorinated ionomer as a single ion conductor in acetone/methanol used as a co-solvent to obtain a solution containing 2% by weight of the copolymer. Then, silica was added to the solution in an amount of 20% by weight, based on the total weight of the copolymer. A dispersion thus obtained was cast on a porous polyethylene film with a thickness of 25 μm and the co-solvent was then evaporated. As a result, a composite polymer matrix structure with different morphologies in which a compact microporous polymer matrix was coated on a surface of the porous polyethylene film was obtained. The obtained composite polymer matrix structure was transferred into a glove box of an argon atmosphere and then immersed in an electrolyte solution in which 1M lithium hexafluorophosphate was contained in a mixture solvent (1:1, molar ratio) of ethylene carbonate and dimethyl carbonate to produce a polymer electrolyte.

EXAMPLE 2

A polymer electrolyte was manufactured in the same manner as in Example 1 except that 5% by weight of a coating solution was used.

EXAMPLE 3

A polymer electrolyte was manufactured in the same manner as in Example 1 except that 10% by weight of a coating solution was used.

EXAMPLE 4

A polymer electrolyte was manufactured in the same manner as in Example 1 except that methylmethacrylate/alkaline metal methacrylate copolymer ionomer was used instead of the perfluorinated ionomer.

EXAMPLE 5

A polymer electrolyte was manufactured in the same manner as in Example 1 except that 10% by weight of $TiO_2$ was used instead of the silica.

EXAMPLE 6

A polymer electrolyte was manufactured in the same manner as in Example 1 except that a porous polytetrafluoroethylene film with a thickness of 16 μm was used instead of the porous polyethylene film.

COMPARATIVE EXAMPLE

In order to perform characteristics comparison with the polymer electrolytes obtained in Examples 1 through 6, a porous polyethylene film with a thickness of 25 μm was immersed in an electrolyte solution in which 1M lithium hexafluorophosphate was contained in a mixture solvent (1:1, molar ratio) of ethylene carbonate and dimethyl carbonate, to produce a separation film/liquid electrolyte system.

EXAMPLE 7

In order to measure a charge/discharge cycle, individual unit batteries were manufactured using the composite polymer electrolytes obtained in Examples 1, 2, and 3, and the separation film/liquid electrolyte system obtained in Comparative Example. There were used cathode plates made of a mixture of 80% by weight of lithium-manganese-nickel oxide powders, 12% by weight of a conductive agent, and 8% by weight of a binder. Lithium metal foils were used as anode plates. Charge/discharge cycles were repeated in such a way that a charge was carried out until 4.8 V and then a discharge was carried out until 2.0 V, under a charge/discharge current density of 1 mA (C/5 rate).

Figure 3:
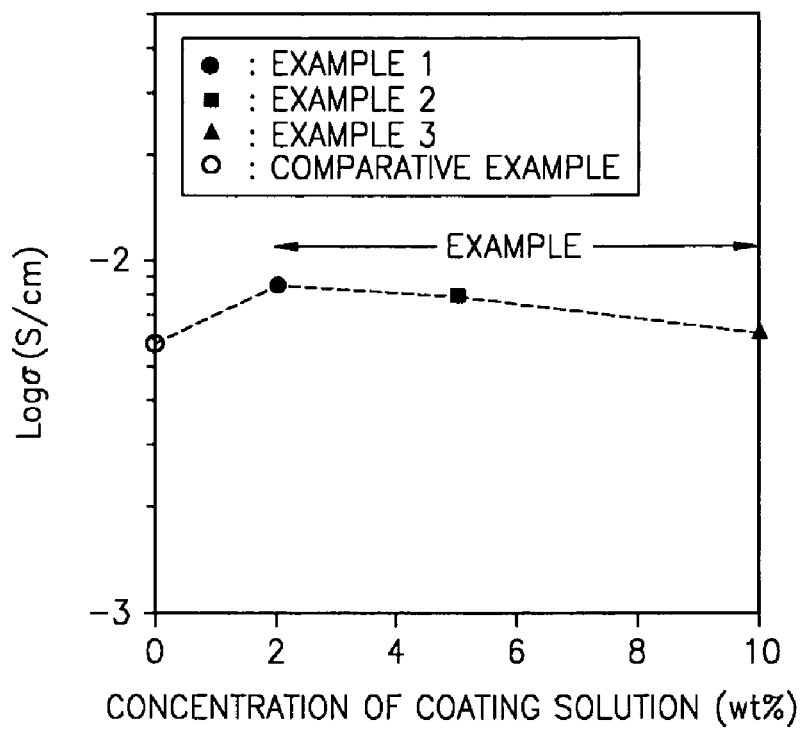
FIG. 3 is a graph showing ionic conductivities of composite polymer electrolytes according to the present invention.

FIG. 3 is a comparative graph showing ionic conductivities of the composite polymer electrolytes of the present invention and the separation film/liquid electrolyte system of Comparative Example. The composite polymer electrolytes of the present invention were those obtained in Examples 1, 2, and 3.

As shown in FIG. 3, the individual polymer electrolytes obtained in Examples 1, 2, and 3 exhibited similar or superior ionic conductivities, as compared to Comparative Example.

Figure 4:
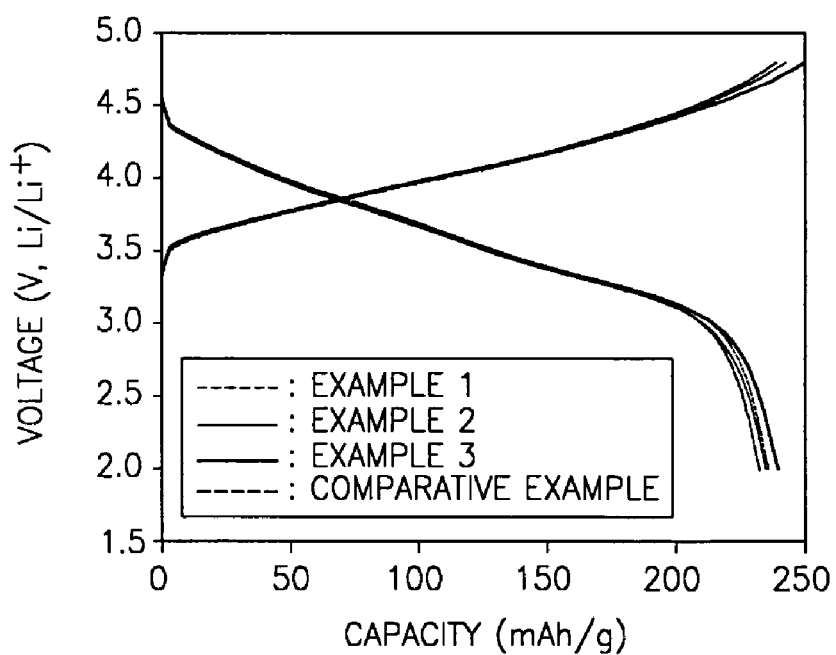
FIG. 4 is a graph showing charge/discharge characteristics of unit batteries using composite polymer electrolytes according to the present invention.

FIG. 4 is a graph showing charge/discharge characteristics of unit batteries using composite polymer electrolytes of the present invention. In detail, FIG. 4 is a comparative graph showing initial charge/discharge characteristics of unit batteries using the polymer electrolytes obtained in Examples 1, 2, and 3, and the separation film/liquid electrolyte system obtained in Comparative Example.

As shown in FIG. 4, the unit batteries using the composite polymer electrolytes of the present invention exhibited initial charge/discharge characteristics similar to Comparative Example commercially available. This result indicates that the initial charge/discharge characteristics of the unit batteries using the composite polymer electrolytes of the present invention are within an acceptable range.

Figure 5:
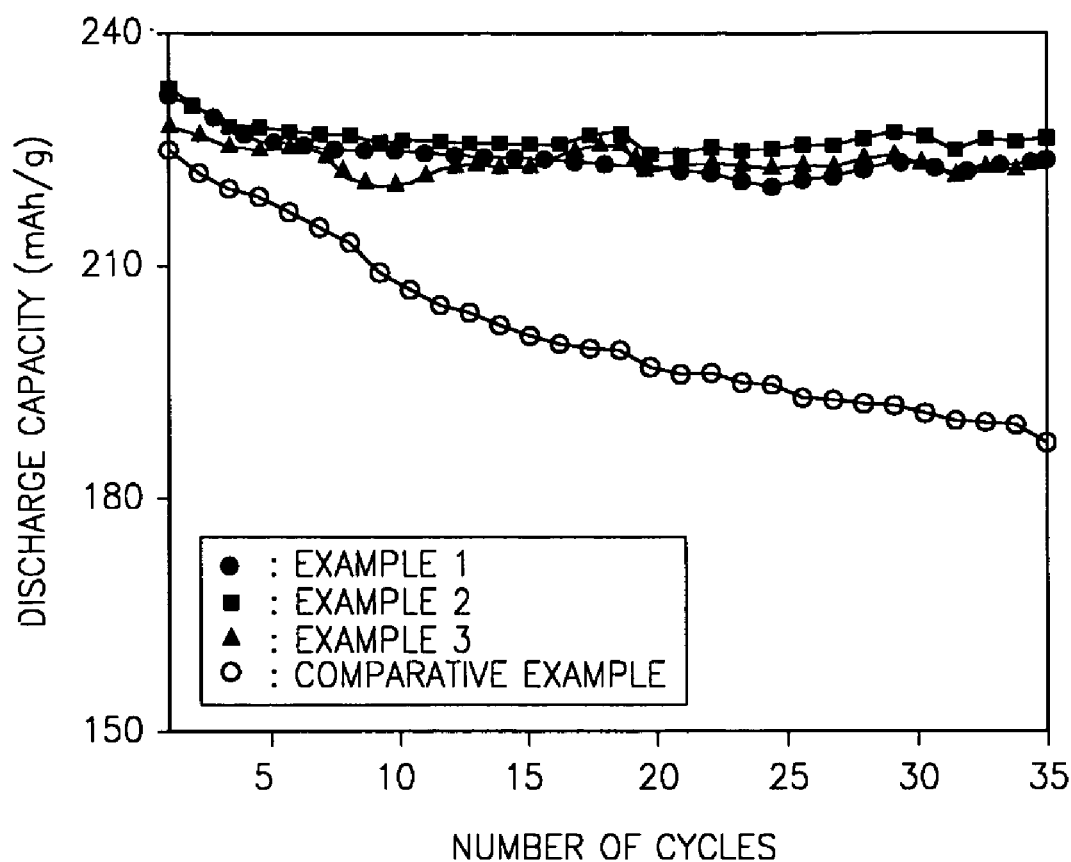
FIG. 5 is a graph showing cycle performance of unit batteries using composite polymer electrolytes according to the present invention.

FIG. 5 is a graph showing cycle performance of unit batteries using composite polymer electrolytes of the present invention. In detail, FIG. 5 is a comparative graph showing the cycle performance of unit batteries using the polymer electrolytes obtained in Examples 1, 2, and 3 and the separation film/liquid electrolyte system obtained in Comparative Example.

As shown in FIG. 5, the unit batteries using the composite polymer electrolytes of the present invention exhibited the maintenance ability of excellent discharge capacity, as compared to Comparative Example.

As is apparent from the above description, the polymer electrolyte for a lithium secondary battery according to the present invention includes a composite polymer matrix structure. The composite polymer matrix structure includes the first polymer matrix with good mechanical properties, and the second polymer matrix with more compact porous structure (submicro-scale) than the first polymer matrix, coated on a surface of the first polymer matrix. The composite polymer matrix structure has different morphologies by different pore sizes, thereby providing enhanced mechanical properties, as compared to a conventional gel polymer electrolyte. The single ion conductor of the second polymer matrix with a submicro-scale porous structure can remarkably enhance ionic conductivity. Furthermore, erosion of a lithium anode and dendritic growth of lithium on a surface of the lithium anode can be prevented, thereby preventing a short-circuit of the battery. Still furthermore, charge/discharge cycle performance and stability of a lithium metal polymer secondary battery can be remarkably enhanced.

In addition, the polymer electrolyte for a lithium battery of the present invention can be manufactured in the form of an ultra-thin film. Also, post-injection of the electrolyte solution can simplify a manufacture process, thereby increasing a process yield.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A composite polymer electrolyte for a lithium secondary battery, which comprises:
   a first polymer matrix made of a first porous polymer with a first pore size, wherein the first porous polymer is polyethylene, polypropylene, polyimide, polysulfone, polyurethane, polyvinylchloride, cellulose, nylon, polyacrylonitrile, polyvinylidene fluoride, polytetrafluoroethylene, a copolymer or blend thereof, and wherein the first polymer matrix does not comprise a polymer type single ion conductor;
   a second polymer matrix coated on the first polymer matrix and made of a single ion conductor consisting essentially of polymer, an inorganic material, and a second porous polymer with a second pore size smaller than the first pore size, wherein the second porous polymer is a vinylidene fluoride based polymer, an acrylate based polymer, a copolymer or a blend thereof, and wherein the second polymer matrix has an ionic conductivity equal to or higher than the ionic conductivity of the first polymer matrix; and
   an electrolyte solution impregnated into the first polymer matrix and the second polymer matrix.

2. The composite polymer electrolyte of claim 1, wherein the single ion conductor is perfluorinated ionomer, methylmethacrylate/alkaline metal methacrylate copolymer ionomer, methylmethacrylate/alkaline itaconate copolymer ionomer, methylmethacrylate/alkaline maleate copolymer ionomer, polystyrene ionomer, or a blend thereof.

3. The composite polymer electrolyte of claim 1, wherein the second porous polymer is a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybutylmethacrylate, polyvinylacetate, polyethylene oxide, polypropylene oxide, a copolymer or blend thereof.

4. The composite polymer electrolyte of claim 1, wherein the inorganic material is selected from the group consisting of silica, talc, alumina ($Al_2O_3$), $\gamma LiAlO_2$, $TiO_2$, zeolite, molybdenum phosphate hydrate, and tungsten phosphate hydrate.

5. The composite polymer electrolyte of claim 1, wherein the inorganic material is added in an amount of 1 to 100% by weight, based on the total weight of the polymer of the second porous matrix.

6. The composite polymer electrolyte of claim 1, wherein the first polymer matrix has a thickness of 10 to 25 µm and the second polymer matrix has a thickness of 0.5 to 10 µm.

7. The composite polymer electrolyte of claim 1, wherein the electrolyte solution is made of ethylene carbonate, propylene carbonate, dimethyl carbonate, diethyl carbonate, methylethyl carbonate, tetrahydrofuran, 2-methyltetrahydrofuran, dimethoxyethane, methyl formate, ethyl formate, gamma-butyrolactone, or a mixture thereof.

8. The composite polymer electrolyte of claim 1, wherein the electrolyte solution is impregnated into the first polymer matrix and the second polymer matrix in an amount of 1 to 1,000% by weight, based on the total weight of the polymer of the first polymer matrix and the second polymer matrix.

9. The composite polymer electrolyte of claim 1, wherein the electrolyte solution comprises at least one lithium salt selected from the group consisting of lithium perchlorate ($LiClO_4$), lithium triflate ($LiCF_3SO_3$), lithium hexafluorophosphate (LiPF$_6$), lithium tetrafluoroborate (LiBF$_4$), and lithium trifluoromethanesulfonylimide (LiN(CF$_3$SO$_2$)$_2$).

10. The composite polymer electrolyte of claim 9, wherein the lithium salt is dissolved in the electrolyte solution in an amount of 1 to 200% by weight, based on the total weight of the polymer of the first polymer matrix and the second polymer matrix.

11. A method of manufacturing a composite polymer electrolyte for a lithium secondary battery, the method comprising:

preparing a first polymer matrix made of a first porous polymer with a first pore size, wherein the first porous polymer is polyethylene, polypropylene, polyimide, polysulfone, polyurethane, polyvinylchloride, cellulose, nylon, polyacrylonitrile, polyvinylidene fluoride, polytetrafluoroethylene, a copolymer, or a blend thereof, and wherein the first polymer matrix does not comprise a polymer single ion conductor;

uniformly dissolving a single ion conductor consisting essentially of polymer, an inorganic material, and a second porous polymer with a second pore size smaller than the first pore size in a co-solvent in a predetermined ratio to produce a solution, wherein the second porous polymer is a vinylidene fluoride based polymer, an acrylate based polymer, a copolymer, or a blend thereof;

coating the first polymer matrix with the solution to form a second polymer matrix on the first polymer matrix, wherein the second polymer matrix has an ionic conductivity equal to or higher than the ionic conductivity of the first polymer matrix; and impregnating the first polymer matrix and the second polymer matrix with an electrolyte solution.

12. The method of claim 11, wherein the co-solvent is selected from the group consisting of ethanol, methanol, isopropyl alcohol, acetone, dimethylformamide, dimethylsulfoxide, N-methylpyrrolidone, and a mixture thereof.

* * * * *